(No Model.)
G. BUCHHOLZ.
ANTI FRICTION BEARING.
No. 393,141. Patented Nov. 20, 1888.
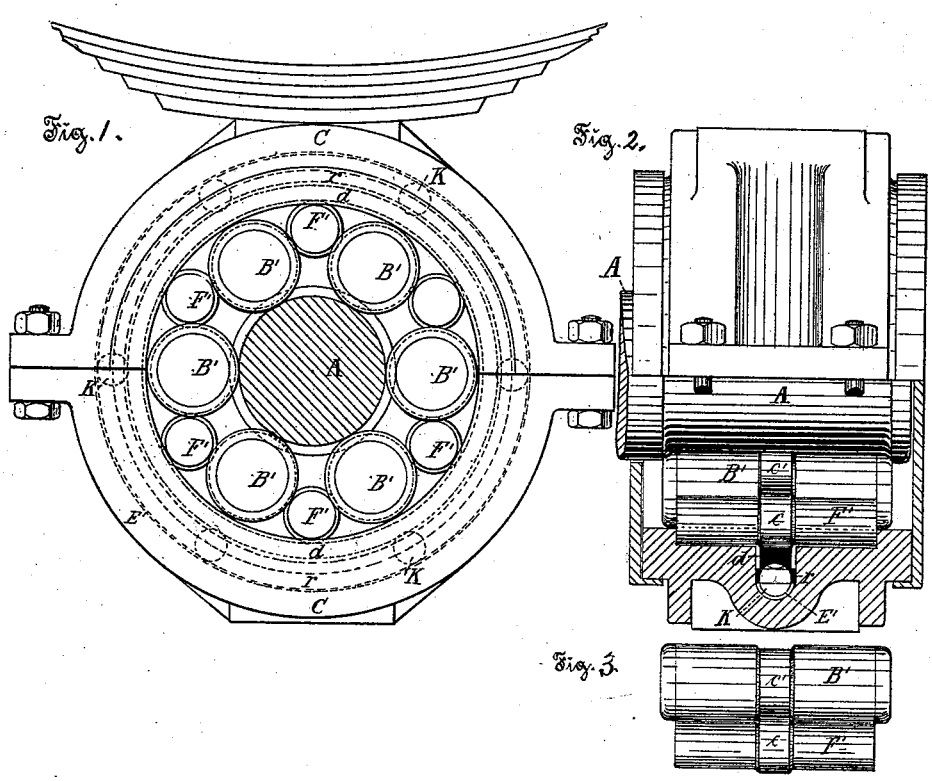
Witnesses.
Paul Fischer
Inventor.
Gustav Buchholz,
by his attys.

United States Patent Office.

GUSTAV BUCHHOLZ, OF BERLIN, GERMANY.

ANTI-FRICTION BEARING.

SPECIFICATION forming part of Letters Patent No. 393,141, dated November 20, 1888.

Application filed January 8, 1887. Serial No. 223,804. (No model.) Patented in Germany July 20, 1886, No. 39,197; in England July 24, 1886, No. 9,595; in France July 26, 1886, No. 177,596, and in Belgium July 26, 1886, No. 73,980.

*To all whom it may concern:*

Be it known that I, GUSTAV BUCHHOLZ, of Berlin, in the Kingdom of Prussia and German Empire, have invented new and useful Anti-Friction Bearings, (for which I have obtained patents in Germany, No. 39,197, dated July 20, 1886; France, No. 177,596, dated July 26, 1886; Belgium, No. 73,980, dated July 26, 1886, and Great Britain, No. 9,595, dated July 24, 1886,) of which the following is a specification, reference being had therein to the accompanying drawings.

This invention relates to bearings for shafts, car-axles, &c.; and it consists of an improved construction of anti-friction bearings, as hereinafter described and claimed. In the construction of bearings for shafts, car-axles, &c., it is important that the amount of bearing-surface should be reduced as much as possible consistently with their use and required strength, and to prevent as far as possible overheating and wasteful consumption of lubricating matter, as large bearing-surfaces require a large amount of lubricant and cause a rapid destruction of bearing parts.

By my construction, surrounding the axle with a series of rollers and other devices within the shell, only a small amount of surface is subject to friction and much overheating and consequent wearing are avoided.

In the accompanying drawings, Figure 1 represents a shaft in the journal-box provided with my improved bearing. Fig. 2 is a side view of same, partly in section, and Fig. 3 represents two of the rollers employed.

In the drawings, A designates the axle, the main bearing-surface of which is reduced in diameter, as shown. The axle is surrounded by a series of rollers, B, bearing at intervals against the reduced surface of A. To keep said rollers B in proper relative positions, a number of smaller rollers, F', are employed, each of which bears against two of the rollers B. The rollers B have each a central annular groove, $c'$, which adjoins a central annular enlargement, $c$, formed on roller F', as shown in Figs. 2 and 3. The shell C, inclosing the shaft and bearing devices, is grooved to receive the rollers F'. A central groove, E', is also formed in the shell C to receive a metal ring, $d$, which bears against the enlarged central portions of the rollers F'. To render the ring $d$ easily movable, small balls K are placed between said ring and the shell, these balls being kept in relative position by a perforated ring, $r$, said balls being loose in the apertures in said ring.

By this construction the bearing-surfaces are greatly reduced and the removal and replacement of damaged parts readily effected, the bearing-shell being divided in two parts, which are secured together by bolts. When any of the bearing parts become worn or defective, it is only necessary to reverse the position of the bearing.

What I claim is—

1. In a bearing for shafts and axles, the combination of a series of rollers encircled by ring $d$, an inclosing-shell concentric with said ring, a perforated ring lying between ring $d$ and the inclosing-shell, and provided with balls inserted in the apertures, substantially as and for the purpose set forth.

2. The combination, with a shaft having a reduced bearing-surface, of a series of grooved rollers, B, rollers F', provided with central enlargements, a ring, $d$, balls K, perforated ring $r$, and a grooved inclosing-shell, substantially as and for the purposes set forth.

In witness whereof I have hereunto set my hand in presence of two witnesses.

GUSTAV BUCHHOLZ.

Witnesses:
D. H. BRACKEBURCH,
B. ROI.